United States Patent
Wright

(10) Patent No.: US 10,238,902 B2
(45) Date of Patent: Mar. 26, 2019

(54) EXPULSION OF A FIRE SUPPRESSANT FROM A CONTAINER

(71) Applicant: The Boeing Company, Chicago, IL (US)

(72) Inventor: Robert S. Wright, Seattle, WA (US)

(73) Assignee: The Boeing Company, Chicago, IL (US)

( * ) Notice: Subject to any disclaimer, the term of this patent is extended or adjusted under 35 U.S.C. 154(b) by 43 days.

(21) Appl. No.: 15/258,726

(22) Filed: Sep. 7, 2016

(65) Prior Publication Data
US 2018/0064975 A1      Mar. 8, 2018

(51) Int. Cl.
| | |
|---|---|
| A62C 35/00 | (2006.01) |
| A62C 35/02 | (2006.01) |
| A62C 35/13 | (2006.01) |
| F16K 17/40 | (2006.01) |
| A62C 13/00 | (2006.01) |

(52) U.S. Cl.
CPC .......... *A62C 35/023* (2013.01); *A62C 13/003* (2013.01); *A62C 35/13* (2013.01); *F16K 17/403* (2013.01)

(58) Field of Classification Search
CPC ........ A62C 35/02; A62C 35/023; A62C 35/13
USPC ........................................... 169/6, 7, 11, 46
See application file for complete search history.

(56) References Cited

U.S. PATENT DOCUMENTS

| | | | | |
|---|---|---|---|---|
| 2,605,848 A | * | 8/1952 | Carter ................. | A62C 13/006 |
| | | | | 169/75 |
| 2,804,929 A | * | 9/1957 | Plummer ............. | A62C 13/003 |
| | | | | 137/67 |
| 3,012,613 A | * | 12/1961 | DiQuattro ............... | A62C 3/08 |
| | | | | 169/9 |

(Continued)

FOREIGN PATENT DOCUMENTS

| | | |
|---|---|---|
| GB | 2486185 A | 6/2012 |
| WO | WO2013/028053 A1 | 2/2013 |

OTHER PUBLICATIONS

Aerojet, "Aerojet Solid Propellant and Hybrid Fire Extinguishers for Halon Replacement," FAA International Fire and Cabin Safety Research Conference, Oct. 29-Nov. 1, 2007, 11 pages.

(Continued)

*Primary Examiner* — Viet Le
(74) *Attorney, Agent, or Firm* — McDonnell Boehnen Hulbert & Berghoff LLP

(57) ABSTRACT

Disclosed herein is an example method for expelling a fire suppressant from a container into a distribution manifold. The method includes generating a propellant gas that flows into the container via a first port of the container, thereby causing a pressure within the container to increase. The container includes the fire suppressant prior to the generation of the propellant gas. The method further includes, in response to the pressure within the container exceeding a threshold pressure, expelling the fire suppressant from a second port of the container into the distribution manifold. The generated propellant gas continues to flow into the (Continued)

container via the first port at least until substantially all of the fire suppressant included within the container prior to the generation of the propellant gas is expelled from the container via the second port. Example fire suppression systems are also disclosed herein.

19 Claims, 11 Drawing Sheets

(56) References Cited

U.S. PATENT DOCUMENTS

| | | | | |
|---|---|---|---|---|
| 3,139,934 | A * | 7/1964 | Gorski | A62C 99/0027 169/11 |
| 3,773,111 | A * | 11/1973 | Dunn | A62C 3/006 169/26 |
| 4,319,640 | A * | 3/1982 | Brobeil | A62C 35/02 169/28 |
| 4,889,189 | A * | 12/1989 | Rozniecki | A62C 13/68 169/26 |
| 5,393,437 | A | 2/1995 | Bower | |
| 5,423,384 | A * | 6/1995 | Galbraith | A62C 35/023 149/21 |
| 5,449,041 | A * | 9/1995 | Galbraith | A62C 35/023 102/290 |
| 5,613,562 | A | 3/1997 | Galbraith et al. | |
| 5,884,710 | A * | 3/1999 | Barnes | A62C 5/00 169/12 |
| 5,992,528 | A * | 11/1999 | Parkinson | A62C 13/22 169/26 |
| 6,016,874 | A | 1/2000 | Bennett | |
| 6,024,889 | A * | 2/2000 | Holland | A62D 1/06 149/61 |
| 6,076,468 | A * | 6/2000 | DiGiacomo | C06B 23/04 102/530 |
| 6,095,251 | A * | 8/2000 | Mitchell | A62C 99/0018 169/26 |
| 6,116,348 | A * | 9/2000 | Drakin | A62C 5/006 169/12 |
| 6,164,383 | A * | 12/2000 | Thomas | A62C 3/07 169/26 |
| 6,217,788 | B1 * | 4/2001 | Wucherer | A62C 5/006 149/17 |
| 6,257,341 | B1 * | 7/2001 | Bennett | A62C 5/006 169/85 |
| 6,513,602 | B1 * | 2/2003 | Lewis | A62C 5/006 149/19.1 |
| 6,612,243 | B1 * | 9/2003 | Italiane | A62C 13/22 102/367 |
| 6,702,033 | B1 * | 3/2004 | Mitchell | A62C 35/023 169/85 |
| 7,143,833 | B2 * | 12/2006 | Gaidano | A62C 5/006 169/30 |
| 7,614,458 | B2 * | 11/2009 | Gross | A62C 5/006 102/367 |
| 7,832,493 | B2 * | 11/2010 | Gross | A62C 5/006 102/261 |
| 8,783,372 | B2 * | 7/2014 | Fabre | A62C 13/66 169/11 |
| 8,800,672 | B2 * | 8/2014 | Cerfeuillet | A62C 35/023 169/11 |
| 2004/0216903 | A1 * | 11/2004 | Wierenga | A62C 35/023 169/85 |
| 2004/0226726 | A1 * | 11/2004 | Holland | A62C 3/07 169/62 |
| 2005/0150663 | A1 * | 7/2005 | Fabre | A62C 13/66 169/43 |
| 2005/0173132 | A1 * | 8/2005 | Sjostrom | A62C 3/07 169/73 |
| 2005/0257937 | A1 * | 11/2005 | Fabre | A62C 5/006 169/5 |
| 2007/0007019 | A1 * | 1/2007 | Wierenga | A62C 3/08 169/30 |
| 2007/0158085 | A1 * | 7/2007 | Bourdet | A62C 35/023 169/46 |
| 2012/0168184 | A1 | 7/2012 | Enk, Sr. | |
| 2014/0069667 | A1 * | 3/2014 | Gibaud | A62C 3/08 169/62 |
| 2015/0165251 | A1 * | 6/2015 | Marlin | A62C 35/023 169/61 |

OTHER PUBLICATIONS

Deletain, R. et al., "ECOLOG: An Airbus Project addressing the Halon Replacement concern for Engine/APU fire extinguishing application," AIRBUS, 4th Fire and Cabin Safety Conference, Nov. 2007, 28 pages.

Grosshandler, W. L., "Chapter 9: Powder and Panel and Propellant Discharge Technologies," Solid Propellant Gas Generators, pp. 1010-1018.

Lu, Y., et al., "Further Advances in the Development of Hybrid Fire Extinguisher Technology," Halon Options Technical Working Conference, May 2-4, 2000, pp. 371-383.

\* cited by examiner

EXPULSION OF A FIRE SUPPRESSANT FROM A CONTAINER

FIELD

The present disclosure generally relates to methods and systems for expelling a fire suppressant from a container, and more particularly to methods and systems for expelling a fire suppressant from a container by flowing a propellant gas into the container.

BACKGROUND

Some fire suppression systems use vapor pressure sealed within a container to expel a liquid fire suppressant from the container into a distribution manifold. The vapor pressure may be maintained by a propellant gas inside of the container and/or the fire suppressant itself. The fire suppressant may be expelled or released in response to receiving an input at a user interface, or in response to an alarm generated by a sensor such as a smoke detector or a heat sensor, for example. This conventional approach has some drawbacks.

Once the container is filled and sealed to contain the fire suppressant and/or the propellant gas, these liquids and/or vapors are typically stored within the container until the fire suppressant is expelled. The container is generally filled with enough fire suppressant and/or propellant gas such that the vapor pressure within the container is sufficient to discharge the fire suppressant at somewhat cold temperatures. In other situations, the container may be exposed to relatively high temperatures, which may result in the vapor pressure within the container being somewhat high. This means that the container may be designed to have a wall that is thick enough and/or strong enough to contain this high amount of vapor pressure. This may result in the container being heavier and/or larger than the container might otherwise be.

In addition, conventional fire suppression systems may discharge fire suppressant quite differently depending on the ambient temperature when the discharge occurs. As mentioned above, the vapor pressure within the sealed container will generally be dependent on the ambient temperature. If the ambient temperature is too low when the discharge is triggered, the vapor pressure within the container may be insufficient to sustain a proper discharge of the fire suppressant. That is, some of the fire suppressant may be discharged with insufficient pressure to extinguish a fire. Additionally, at such low discharge pressures, the fire suppressant may evaporate before reaching discharge nozzles, adding further variability. Also, the pressure within the container generally decreases as the fire suppressant and/or the propellant gas exit the container, regardless of the ambient temperature.

Accordingly, there is a need for a fire suppression system that provides a relatively stable discharge pressure and allows for a smaller and/or lighter fire suppressant container.

SUMMARY

A first example discloses a method for expelling a fire suppressant from a container into a distribution manifold. The method includes generating a propellant gas that flows into the container via a first port of the container, thereby causing a pressure within the container to increase. The container includes the fire suppressant prior to the generation of the propellant gas. The method further includes, in response to the pressure within the container exceeding a threshold pressure, expelling the fire suppressant from a second port of the container into the distribution manifold. The generated propellant gas continues to flow into the container via the first port at least until substantially all of the fire suppressant included within the container prior to the generation of the propellant gas is expelled from the container via the second port.

A second example discloses a fire suppression system. The fire suppression system includes a container including a fire suppressant. The container includes a first port and a second port. The fire suppression system further includes a gas generator coupled to the first port. The gas generator is configured to generate and flow a propellant gas into the container via the first port. The fire suppression system further includes a distribution manifold coupled to the second port and a disc sealing the second port. The disc is configured to (a) rupture in response to a pressure within the container exceeding a threshold pressure and (b) in response to the rupture, release the fire suppressant into the distribution manifold.

A third example discloses a fire suppression system. The fire suppression system includes a container including a fire suppressant. The container includes a first port and a second port. The fire suppression system further includes a gas generator coupled to the first port. The gas generator is configured to generate and flow a propellant gas into the container via the first port. The fire suppression system further includes a distribution manifold coupled to the second port and a disc sealing the second port. The disc is configured to (a) rupture in response to a pressure within the container exceeding a threshold pressure and (b) in response to the rupture, release the fire suppressant into the distribution manifold. The fire suppression system further includes a user interface that is configured to (a) receive user input and (b) in response to receiving the user input, send a control input to the gas generator to cause the gas generator to generate the propellant gas. At least 60% and no more than 80% of a total volume of the container is filled with the fire suppressant.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying Figures.

DETAILED DESCRIPTION

Figure 1:
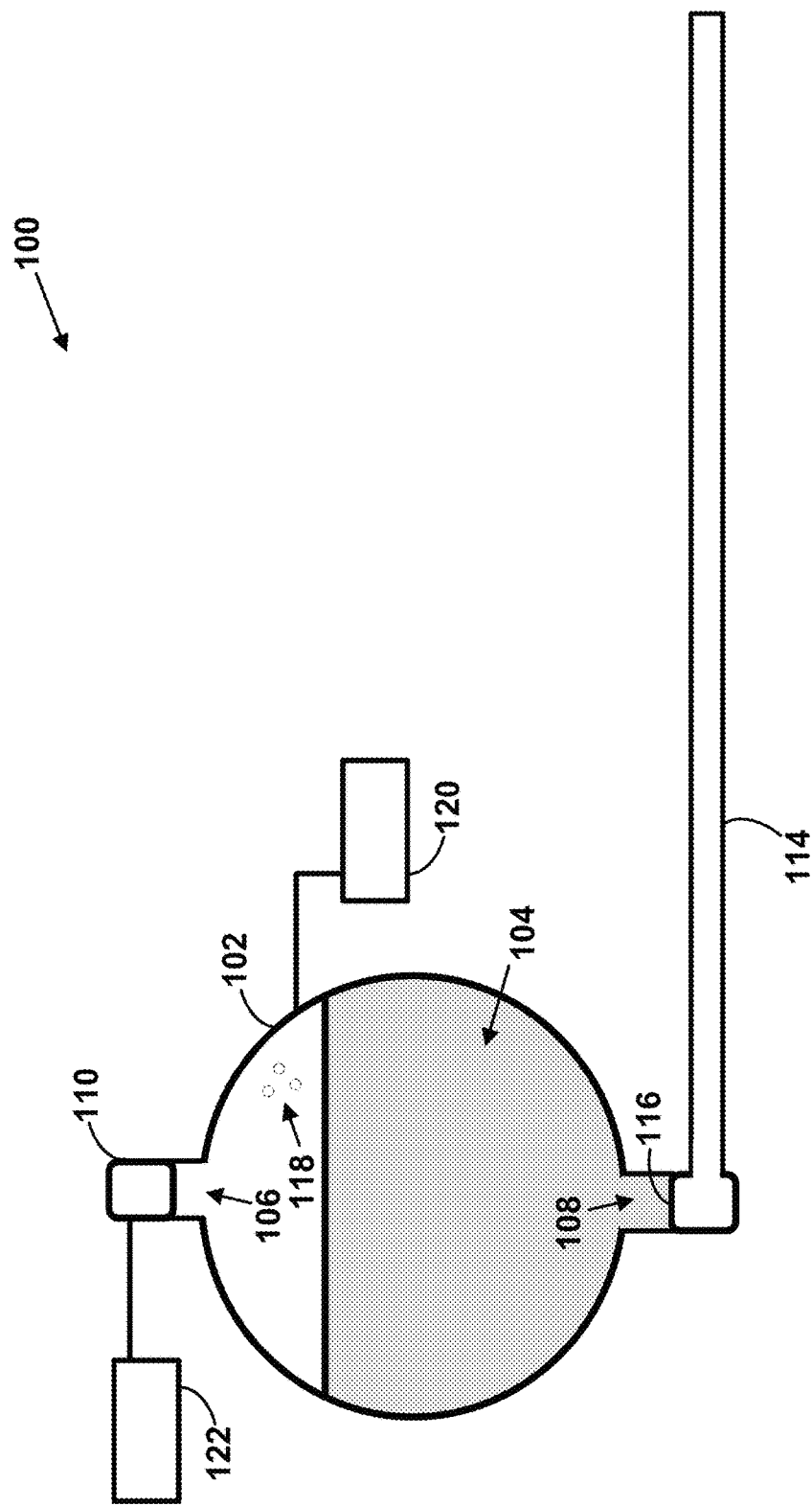
FIG. 1 illustrates an example fire suppression system, according to an example embodiment.

Within examples, a fire suppression system may include a container that holds a fire suppressant (e.g., a liquid fire suppressant). Upon detection of a possible fire, the fire suppression system may generate a propellant gas via a gas generator and flow the propellant gas into the container via a first port of the container. As the propellant gas enters the container, the pressure within the container may increase. The container may also include a rupture disc that seals a second port of the container. The rupture disc may be configured to rupture and release the fire suppressant into a distribution manifold via the second port when the pressure within the container exceeds a threshold pressure. The propellant gas may continue to flow into the container until substantially all of the fire suppressant is expelled into the distribution manifold. The distribution manifold may distribute the fire suppressant to various areas for suppression of the possible fire.

The fire suppression system may have advantages when compared to conventional fire suppression systems. Whereas a conventional fire suppression system typically stores the energy to be used for expelling the fire suppressant within the container itself, the fire suppression system disclosed herein may store most of this energy outside of the container within one or more solid precursors of the propellant gas. Storing the energy in a solid form within the gas generator instead of as vapor pressure within the container may allow for the container to have a reduced volume and a reduced wall thickness. Also, since the vapor pressure of the fire suppressant or another propellant gas that is pre-filled into the container is no longer the primary energy source for expelling the fire suppressant, fire suppressants having lower vapor pressures may be used.

Using an energy source that is external to the container may also better regulate the pressure at which the fire suppressant is discharged into the distribution manifold. When vapor pressure stored inside the container is used to expel the fire suppressant, the discharge pressure will generally decrease as the fire suppressant is expelled from the container. This may result in not all of the fire suppressant being expelled from the container and also may result in some of the fire suppressant undesirably evaporating in the distribution manifold before the fire suppressant reaches the possible fire. In the current design, a large amount of externally provided propellant gas coupled with the regulatory function of the rupture disc may result in substantially all of the fire suppressant being expelled into the distribution manifold at a relatively constant pressure. The discharge pressure of the present design may also be less dependent on temperature than conventional designs, because the pressure within the container during discharge will largely be dependent on the size of the rupture disc if the gas generator produces a large amount of propellant gas.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Disclosed embodiments will now be described more fully hereinafter with reference to the accompanying Drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

FIG. 1 illustrates a fire suppression system 100. The fire suppression system 100 may include a container 102, a fire suppressant 104, a port 106, a port 108, a gas generator 110, a distribution manifold 114, a rupture disc 116, a propellant gas 118, a pressure gauge 120, and a control unit 122.

The container 102 may take the form of a metal bottle or tank, however, any form that is suitable for containing pressurized liquids, vapors, and/or gases is possible. The container 102 may contain or hold the fire suppressant 104.

The fire suppressant 104 may take the form of Halon or any Halon replacement material that is known in the art, such as inert gases or halocarbons. Inside the container 102, the fire suppressant 104 may primarily be in the liquid phase, however some of the fire suppressant 104 within the container 102 may exist in the vapor phase as well.

The gas generator 110 may be configured to cause one or more solid precursors of a propellant gas 112 (shown in FIG. 9) to react and produce the propellant gas 112. The gas generator 110 may take the form of a gas generator that can typically be found as part of an automobile supplemental restraint system (e.g., for deploying airbags). The gas generator 110 may be coupled to the container 102 via the port 106.

The distribution manifold 114 may be coupled to the container 102 via the port 108 and the rupture disc 116. The distribution manifold 114 may include a network of pipes configured to distribute the expelled fire suppressant 104 to various areas of interest.

The rupture disc 116 may include a membrane (e.g., a thin metal membrane) that is configured to rupture when exposed to a particular amount of pressure within the container 102. As the rupture disc 116 ruptures, the container 102 may be opened up to the distribution manifold 114.

In some instances, the container 102 may be filled with the propellant gas 118, which may be the same gas as the propellant gas 112 or a different gas than the propellant gas 112. In many examples, the fire suppressant 104 may have a low vapor pressure. Therefore, the container 102 may be charged with the propellant gas 118 as a means for establishing a pressure for the pressure gauge 120 to monitor. In this way, the pressure gauge 120 may monitor the pressure within the container 102 to detect possible leaks within the wall of the container 102.

The control unit 122 may take the form of a smoke detector or a heat detector, for example. The control unit 122 may be configured to detect the presence of conditions that indicate a possible fire. When the control unit 122 detects such conditions (e.g., heat or smoke), the control unit 122 may provide an input to the gas generator 110 that causes the gas generator 110 to begin generating the propellant gas 112.

In other examples, the control unit 122 may take the form of a user interface (e.g., a control panel). For instance, a user may be alerted to the presence of a possible fire via the user's own senses and/or via an alarm provided by a smoke detector or a heat detector. Accordingly, the user may provide input to the user interface, and the user interface may responsively send an input to the gas generator 110 to cause the gas generator 110 to generate the propellant gas 112.

Methods 200, 300, 400, 500, 600, and 700 depicted respectively in FIGS. 2, 3, 4, 5, 6, and 7 present example methods that can be performed by the fire suppression system 100. In other examples, the methods 200-700 may be performed by any combination of one or more suitable components described herein. The methods 300-700 are methods that can be used in conjunction with the method 200, for example.

FIGS. 2-7 may include one or more operations, functions, or actions as illustrated by one or more of blocks 202, 204, 206, 208, 210, 212, 214, 216, and 218. Although the blocks may be illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the methods 200-700, and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in a process. The program code may be stored on any type of computer readable medium, for example, such as a storage device including a disk or hard drive. The computer readable medium may include a non-transitory computer readable medium, for example, such as computer readable media that stores data for short periods of time like register memory, processor cache, or Random Access Memory (RAM). The computer readable medium may also include non-transitory media, such as secondary or persistent long term storage, like read-only memory (ROM), optical or magnetic disks, or compact-disc read-only memory (CD-ROM), for example. The computer readable media may also be any other volatile or non-volatile storage system. The computer readable medium may be considered a computer readable storage medium, a tangible storage device, or other article of manufacture, for example.

In addition, for the methods 200-700 and other processes and methods disclosed herein, each block in FIGS. 2-7 may represent circuitry that is wired to perform the specific logical functions in the process.

Figure 2:
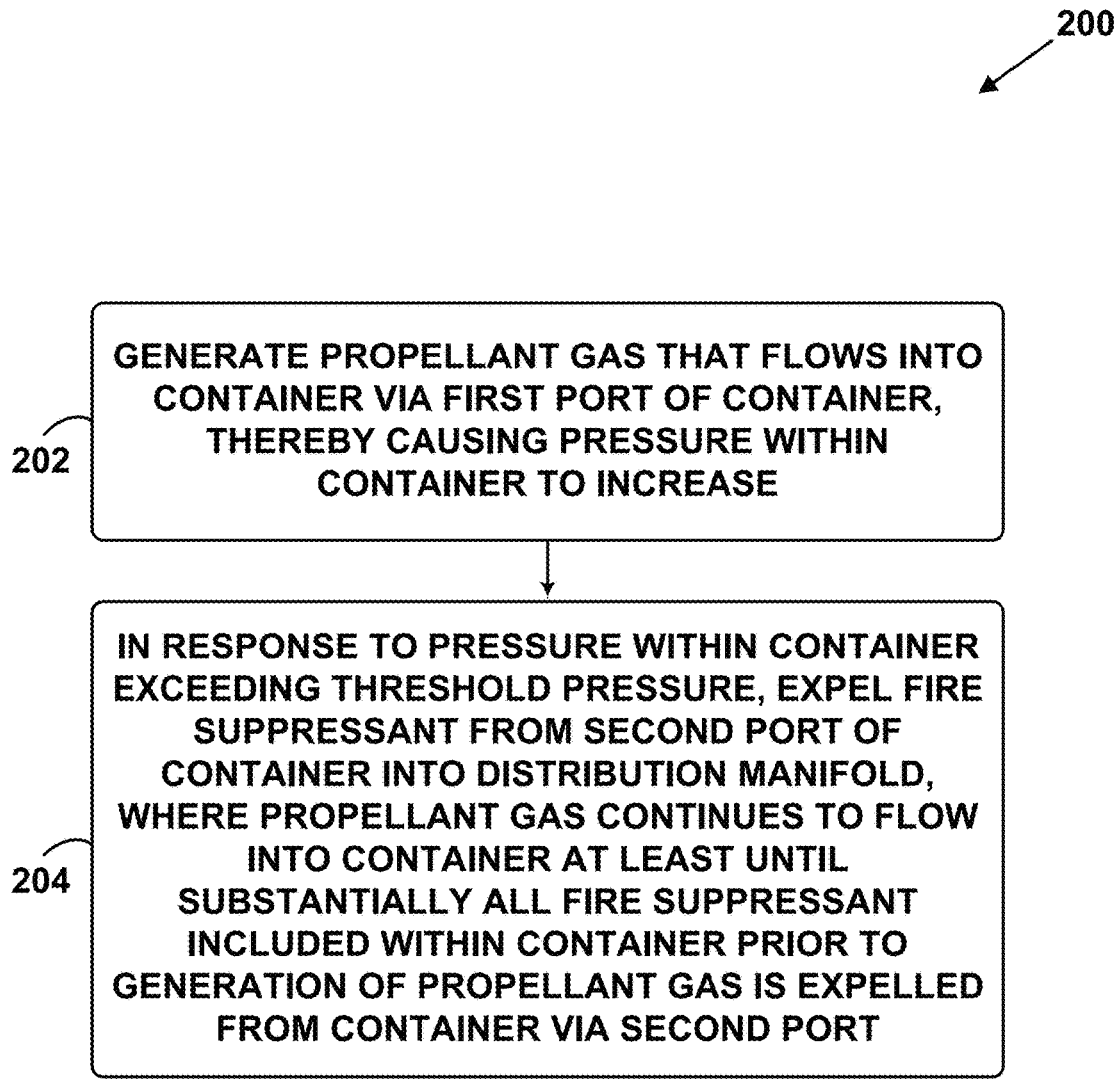
FIG. 2 is a flowchart of an example method for expelling a fire suppressant from a container into a distribution manifold, according to an example embodiment.

Referring to FIG. 2, the method 200 is an example method for expelling a fire suppressant from a container into a distribution manifold.

At block 202, the method 200 includes generating a propellant gas that flows into the container via a first port of the container, thereby causing a pressure within the container to increase. In this context, the container includes the fire suppressant prior to the generation of the propellant gas.

Figure 8:
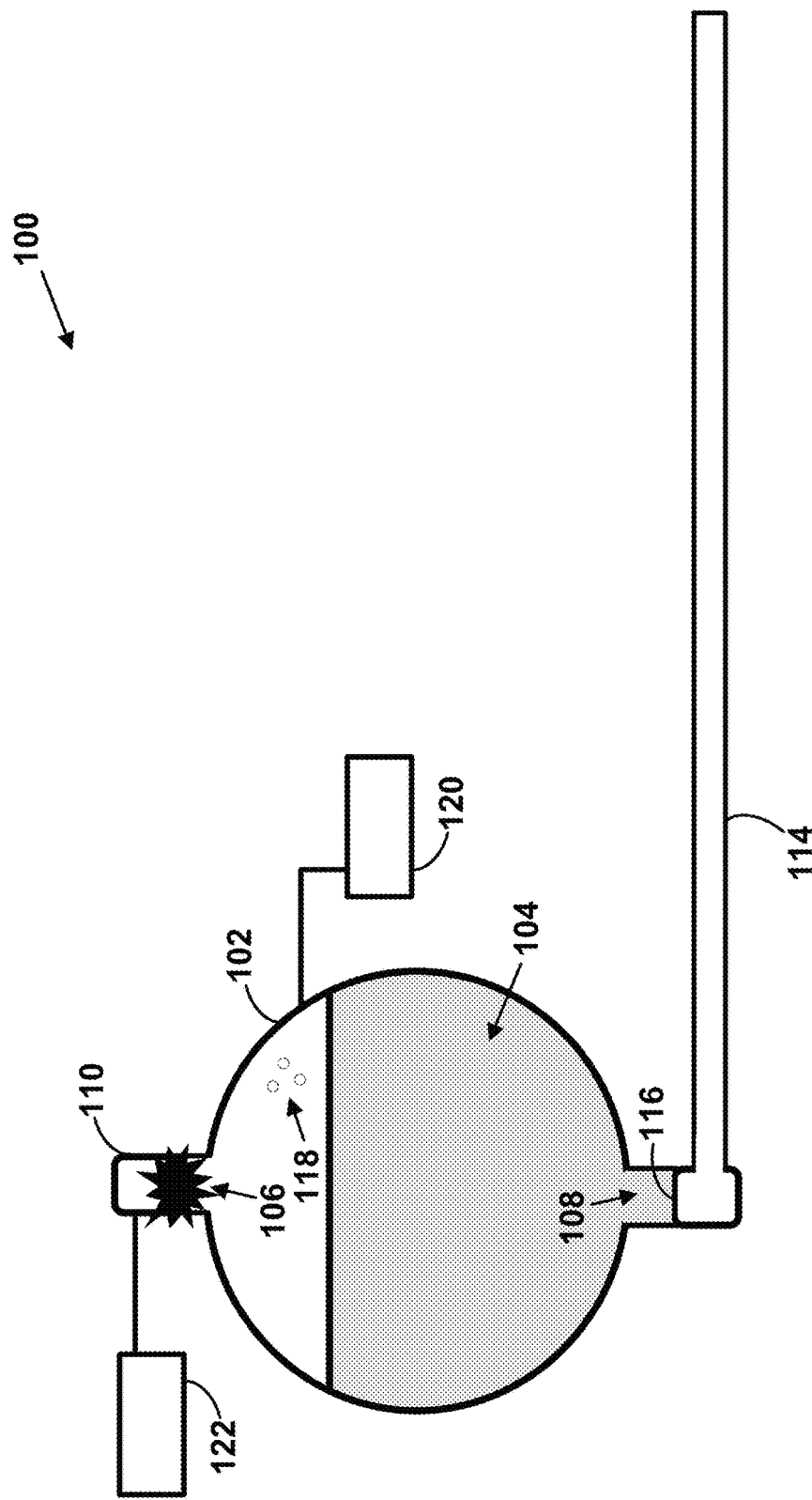
FIG. 8 illustrates an example fire suppression system, according to an example embodiment.
Figure 9:
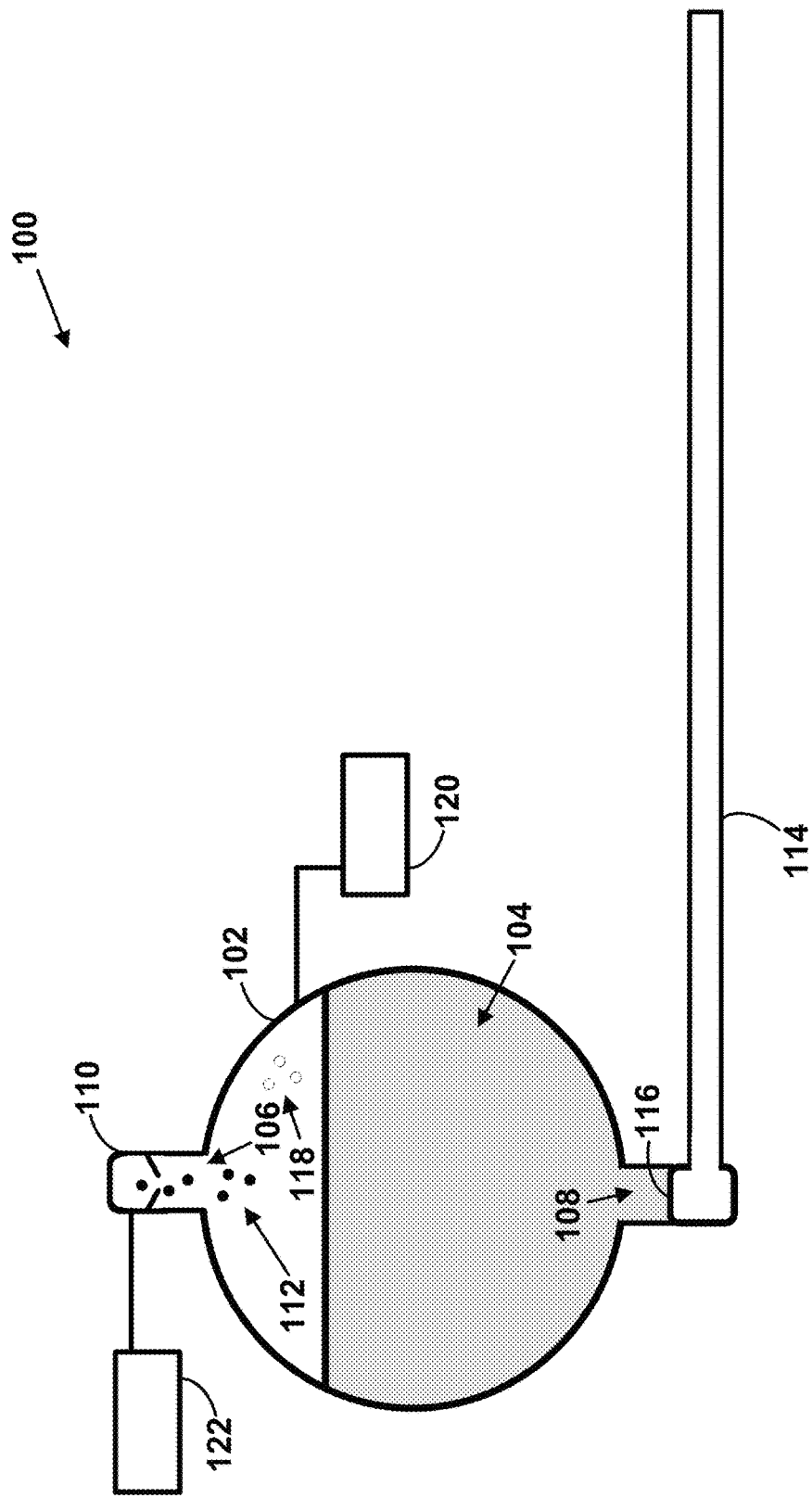
FIG. 9 illustrates an example fire suppression system, according to an example embodiment.

As shown in FIGS. 8-9, for example, the gas generator 110 may generate the propellant gas 112 by initiating a chemical reaction of one or more precursors of the propellant gas 112. The propellant gas 112 may flow into the container 102 via the port 106. As the propellant gas 112 flows into the container 102, the pressure within the container 102 may increase. The gas generator 110 may initiate generation of the propellant gas 112 in response to receiving an input from the control unit 122, as discussed below. As shown in FIG. 8, the container 102 may contain the fire suppressant 104 prior to the generation of the propellant gas 112.

At block 204, the method 200 includes, in response to the pressure within the container exceeding a threshold pressure, expelling the fire suppressant from a second port of the container into the distribution manifold. In this context, the generated propellant gas continues to flow into the container via the first port at least until substantially all of the fire suppressant included within the container prior to the generation of the propellant gas is expelled from the container via the second port.

Figure 10:
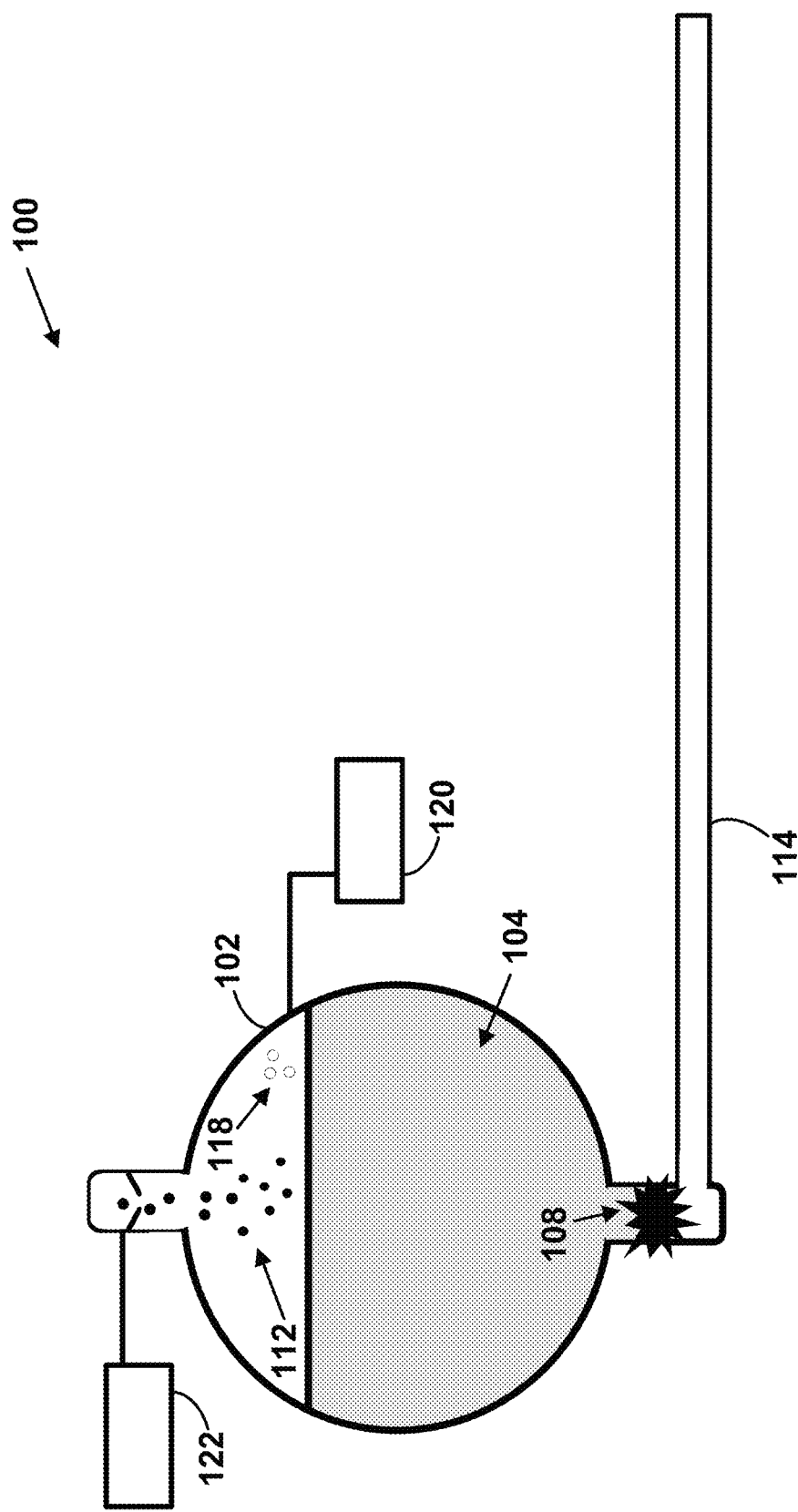
FIG. 10 illustrates an example fire suppression system, according to an example embodiment.

As shown in FIG. 10, the propellant gas 112 may continue to flow into the container 102 and the pressure within the container 102 may increase to exceed a predetermined threshold pressure. At or near the threshold pressure, the rupture disc 116 may rupture and the pressure within the container 102 may begin to expel the fire suppressant 104 from the container 102 via the port 108 into the distribution manifold 114, as shown in FIG. 11.

In some examples, the threshold pressure may be a pressure within a range of 900 pounds per square inch gauge (psig) and 1100 psig. More specifically, the threshold pressure may be substantially equal to 1000 psig. That is, the method 200 may further involve expelling the fire suppressant 104 in response to the pressure within the container 102 exceeding a pressure within a range of 900 psig and 1100 psig, or more specifically, the method 200 may further involve expelling the fire suppressant 104 in response to the pressure within the container 102 exceeding a pressure that is substantially equal to 1000 psig.

Figure 11:
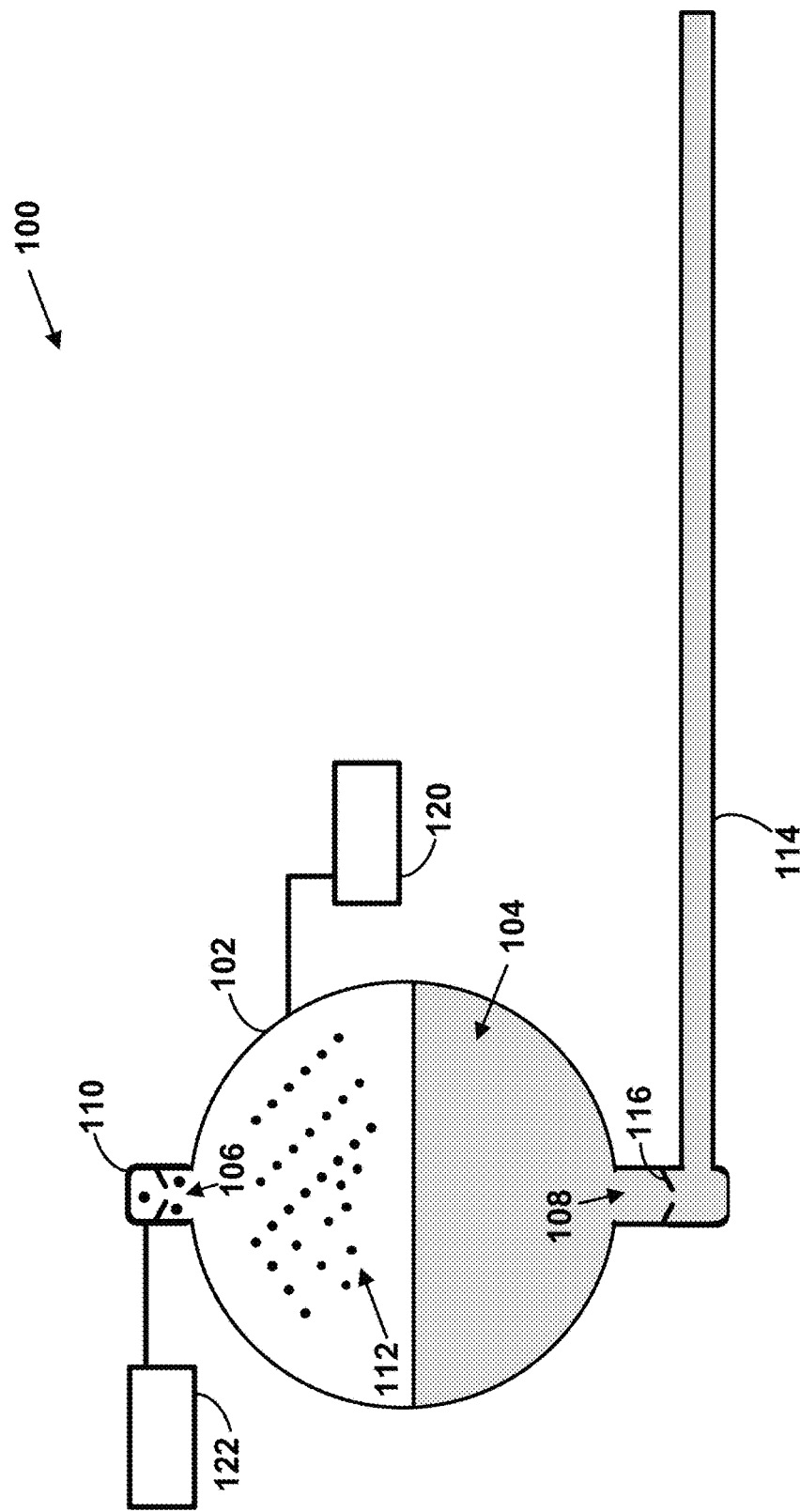
FIG. 11 illustrates an example fire suppression system, according to an example embodiment.
Figure 12:
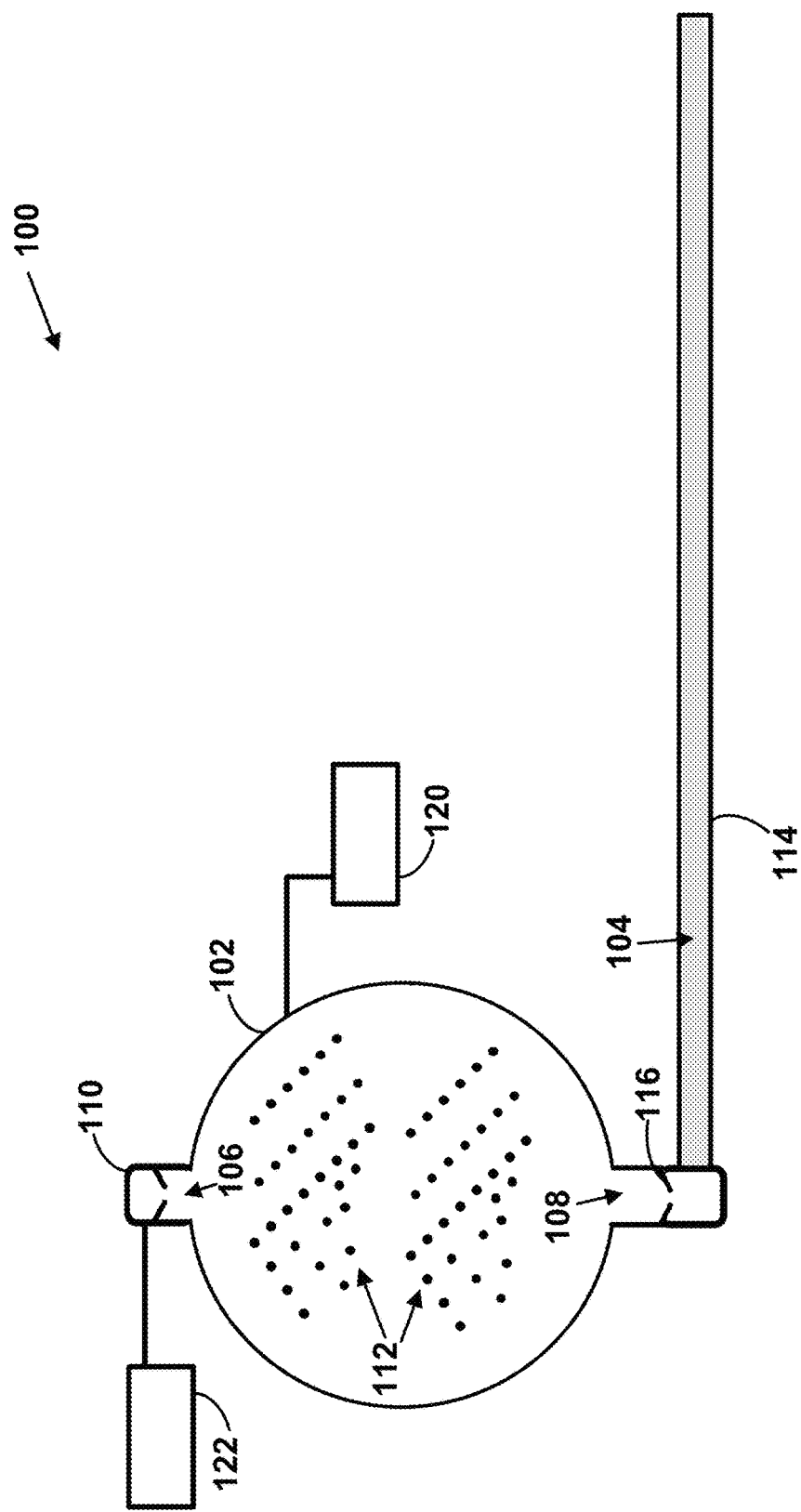
FIG. 12 illustrates an example fire suppression system, according to an example embodiment.

As shown in FIGS. 11 and 12, the propellant gas 112 may continue to flow into the container 102 via the port 106 at least until substantially all of the fire suppressant 104 is expelled from the container 102 via the port 108. FIG. 12 shows that the propellant gas 112 continues to flow into the container 102 after the fire suppressant 104 has been fully or nearly expelled from the container 102.

Figure 3:
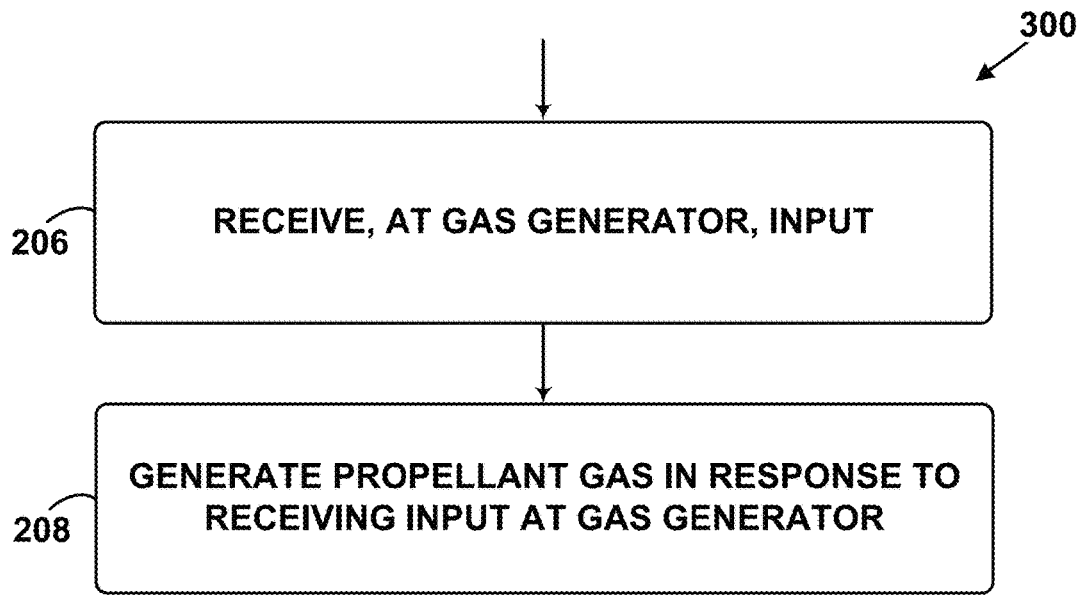
FIG. 3 is a flowchart of another example method for use with the method shown in FIG. 2, according to an example embodiment.

FIG. 3 is a block diagram of the method 300. At block 206, the method 300 includes receiving, at the gas generator, an input. The gas generator 110 may receive the input from the control unit 122, for example. The control unit 122 may include a heat detector, a smoke detector, or a user interface, but other examples are possible.

At block 208, the method 300 includes generating the propellant gas in response to receiving the input at the gas generator. For instance, FIG. 8 shows the gas generator 110 beginning to generate the propellant gas 112 in response to the gas generator 110 receiving an input from the control unit 122. The gas generator 110 may mix one or more solid precursors of the propellant gas 112 in response to receiving the input.

Figure 4:
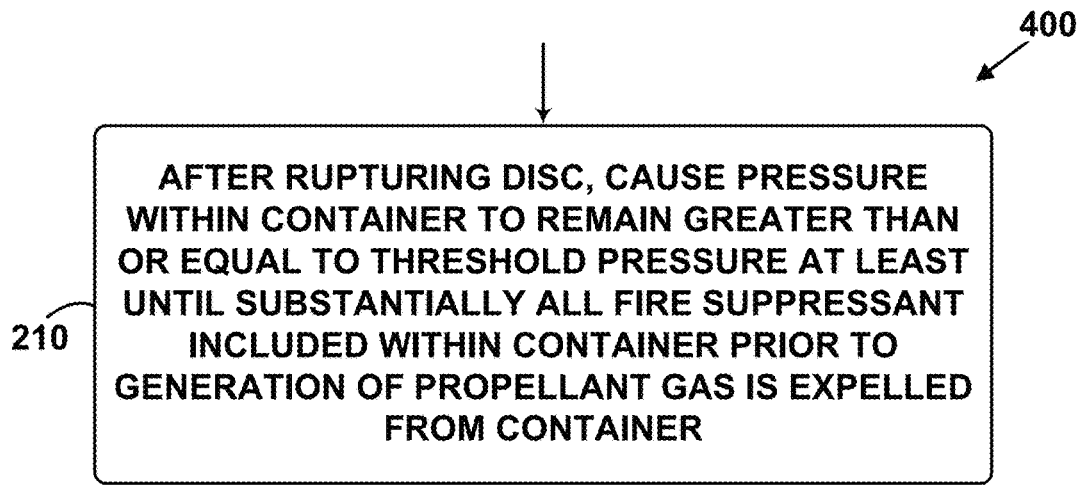
FIG. 4 is a flowchart of another example method for use with the method shown in FIG. 2, according to an example embodiment.

FIG. 4 is a block diagram of the method 400. At block 210, the method 400 includes, after rupturing the disc, causing the pressure within the container to remain greater than or equal to the threshold pressure at least until substantially all of the fire suppressant included within the container prior to the generation of the propellant gas is expelled from the container.

As described above, the gas generator 110 may continue to produce the propellant gas 112 and flow the propellant gas 112 into the container 102 at least until the fire suppressant 104 has been substantially expelled from the container 102. The ruptured disc 116 may perform a regulation function whereby the propellant gas 112 flows into the container 102 at a rate sufficient to maintain the pressure within the container 102 at or above the threshold pressure at least until the fire suppressant 104 has been substantially expelled from the container 102.

Figure 5:
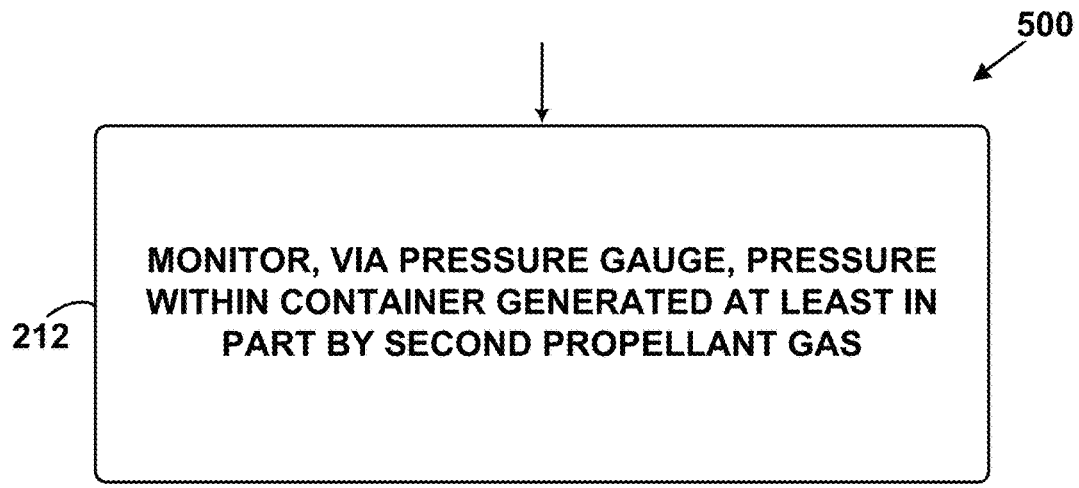
FIG. 5 is a flowchart of another example method for use with the method shown in FIG. 2, according to an example embodiment.

FIG. 5 is a block diagram of the method 500. At block 212, the method 500 includes monitoring, via a pressure gauge, the pressure within the container generated at least in part by the second propellant gas. In this context, a second propellant gas is included within the container prior to the generation of the propellant gas.

Referring to FIG. 1, for example, the propellant gas 118 may be filled into the container 102 along with the fire suppressant 104 prior to sealing the container 102. The pressure gauge 120 may monitor the pressure within the container 102 prior to, during, and/or after expulsion of the fire suppressant 104. The vapor pressure maintained within the container 102 may correspond, at least in part, to the propellant gas 118.

Figure 6:
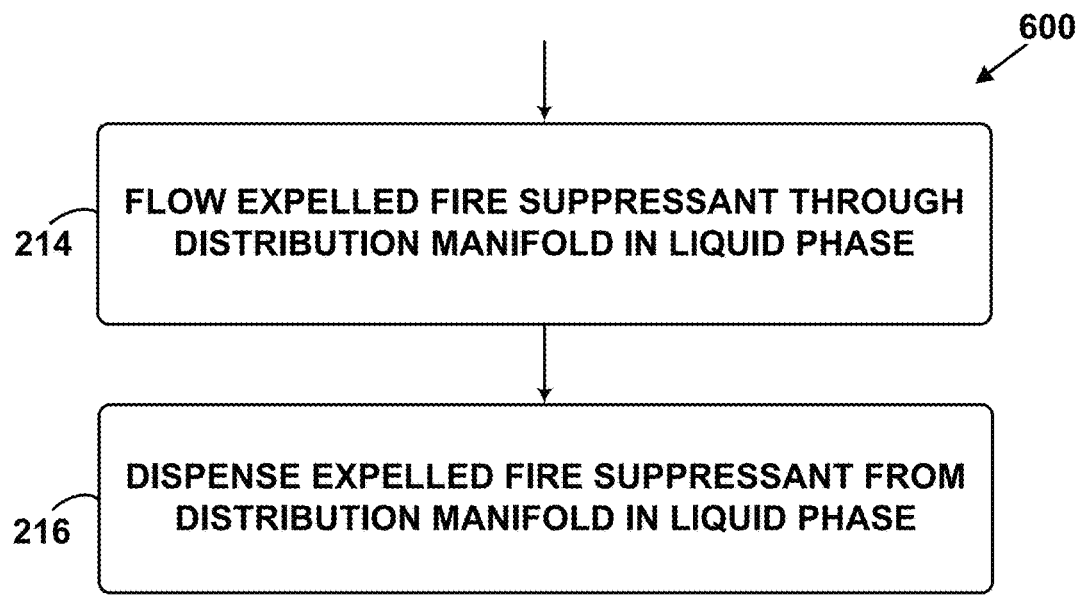
FIG. 6 is a flowchart of another example method for use with the method shown in FIG. 2, according to an example embodiment.

FIG. 6 is block diagram of the method 600. At block 214, the method 600 includes flowing the expelled fire suppressant through the distribution manifold in a liquid phase. At block 216, the method 600 includes dispensing the expelled fire suppressant from the distribution manifold in the liquid phase. As shown in FIG. 12, the continuing generation of the propellant gas 112 may maintain a pressure within the container 102 and the distribution manifold 114 sufficient to keep the fire suppressant 104 from evaporating at least until the fire suppressant 104 reaches dispensing nozzles of the distribution manifold 114.

Figure 7:
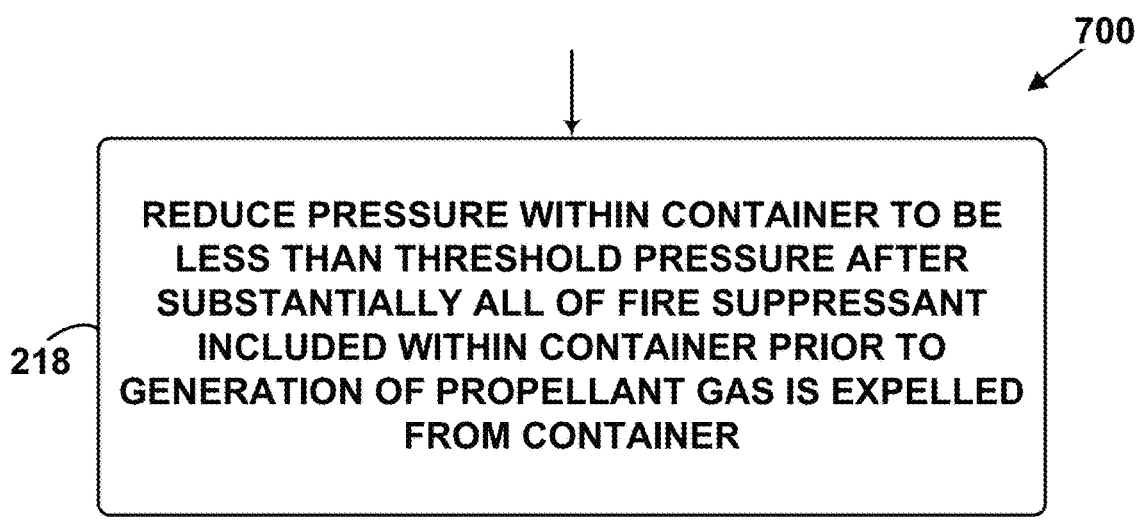
FIG. 7 is a flowchart of another example method for use with the method shown in FIG. 2, according to an example embodiment.

FIG. 7 is a block diagram of the method 700. At block 218, the method 700 includes reducing the pressure within the container to be less than the threshold pressure after substantially all of the fire suppressant included within the container prior to the generation of the propellant gas is expelled from the container. This is discussed in more detail below with reference to FIG. 13.

Figure 13:
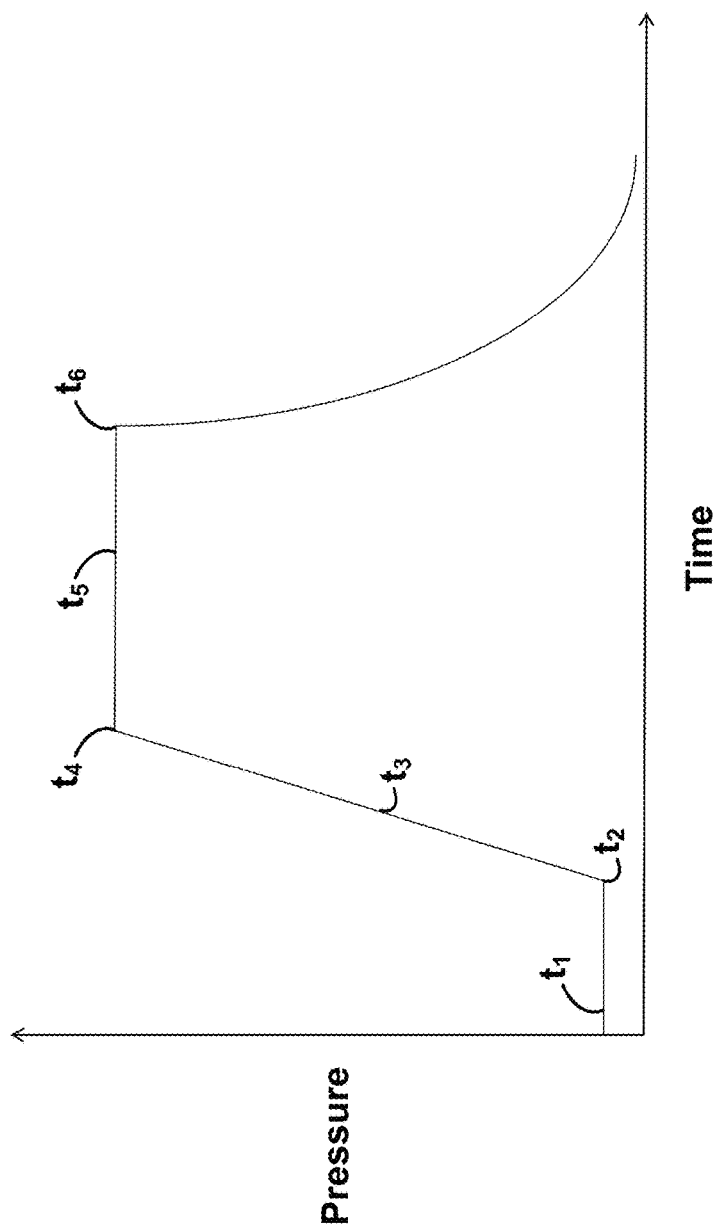
FIG. 13 graphically depicts, with respect to time, a pressure within a container of an example fire suppression system, according to an example embodiment.

FIG. 13 graphically depicts the pressure within the container 102 with respect to time. At time $t_1$ depicted by FIG. 1, the pressure remains somewhat constant at low pressure, as the gas generator 110 has not yet been activated. At time $t_1$, the pressure within the container 102 may primarily correspond to the pre-filled propellant gas 118. At time $t_2$ depicted by FIG. 8, the gas generator 110 is activated and begins generating the propellant gas 112, and the pressure within the container 102 begins to increase. At time $t_3$ depicted by FIG. 9, the propellant gas 112 fills into the container 102 and the pressure increases. At time $t_4$ depicted by FIG. 10, the rupture disc 116 ruptures in response to the pressure within the container 102 exceeding a predetermined threshold pressure. The ruptured rupture disc 116 allows the pressure built up in the container 102 to begin to expel some of the fire suppressant 104 out of the port 108. At time $t_5$ depicted by FIG. 11, the propellant gas 112 continues to fill the container 102 while the fire suppressant 104 continues to be expelled from the container 102. The pressure remains somewhat constant at a high pressure during this time (e.g., near the predetermined threshold pressure). At time $t_6$ depicted by FIG. 12, the gas generator 110 is no longer generating the propellant gas 112, and the pressure begins to decrease as the remainder of the propellant gases and the fire suppressant 104 continue to exit the container 102.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A method for expelling a fire suppressant from a container into a distribution manifold, the method comprising: generating a propellant gas that flows into the container via a first port of the container, thereby causing a pressure within the container to increase, wherein the container includes the fire suppressant prior to the generation of the propellant gas; in response to the pressure within the container exceeding a threshold pressure, expelling the fire suppressant from a second port of the container into the distribution manifold, wherein the generated propellant gas continues to flow into the container via the first port at least until substantially all of the fire suppressant included within the container prior to the generation of the propellant gas is expelled from the container via the second port; and causing the pressure within the container to remain greater than or equal to the threshold pressure at least until substantially all of the fire suppressant included within the container prior to the generation of the propellant gas is expelled from the container, wherein expelling the fire suppressant from the second port of the container into the distribution manifold comprises rupturing a disc that seals the second port in response to the pressure within the container exceeding the threshold pressure.

2. The method of claim 1, wherein generating the propellant gas comprises generating the propellant gas via a gas generator initiating a chemical reaction of one or more precursors of the propellant gas.

3. The method of claim 2, further comprising:
receiving, at the gas generator, an input,
wherein generating the propellant gas comprises generating the propellant gas in response to receiving the input at the gas generator.

4. The method of claim 3, wherein receiving the input comprises receiving the input from a heat detector, a smoke detector, or a user interface.

5. The method of claim 1, wherein causing the pressure within the container to remain greater than or equal to the threshold pressure comprises causing the pressure within the container to remain greater than or equal to the threshold pressure after rupturing the disc.

6. The method of claim 1,
wherein prior to the generation of the propellant gas, a second propellant gas is included within the container, the method further comprising:

monitoring, via a pressure gauge, the pressure within the container generated at least in part by the second propellant gas.

7. The method of claim 1, wherein expelling the fire suppressant comprises expelling the fire suppressant in response to the pressure within the container exceeding a pressure within a range of 900 pounds per square inch gauge (psig) and 1100 psig.

8. The method of claim 1, wherein expelling the fire suppressant comprises expelling the fire suppressant in response to the pressure within the container exceeding a pressure that is substantially equal to 1000 pounds per square inch gauge (psig).

9. The method of claim 1, further comprising:
flowing the expelled fire suppressant through the distribution manifold in a liquid phase and;
dispensing the expelled fire suppressant from the distribution manifold in the liquid phase.

10. The method of claim 1, further comprising reducing the pressure within the container to be less than the threshold pressure after substantially all of the fire suppressant included within the container prior to the generation of the propellant gas is expelled from the container.

11. A fire suppression system comprising:
a container including a fire suppressant, wherein the container comprises a first port and a second port;
a gas generator coupled to the first port, wherein the gas generator is configured to generate and flow a propellant gas into the container via the first port, thereby causing a pressure within the container to increase, the container including the fire suppressant prior to generation of the propellant gas;
a distribution manifold coupled to the second port;
a disc sealing the second port, wherein the disc is configured to (a) rupture in response to the pressure within the container exceeding a threshold pressure and (b) in response to the rupture, release the fire suppressant from the second port into the distribution manifold,
wherein the generated propellant gas is configured to flow into the container via the first port at least until substantially all of the fire suppressant included within the container prior to the generation of the propellant gas is expelled from the container via the second port, and
wherein the generated propellant gas is configured to cause the pressure within the container to remain greater than or equal to the threshold pressure at least until substantially all of the fire suppressant included within the container prior to the generation of the propellant gas is expelled from the container.

12. The fire suppression system of claim 11, further comprising a control unit, wherein the control unit is configured to (a) detect conditions indicative of a presence of a fire and (b) in response to the detected conditions, send an input to the gas generator to cause the gas generator to generate the propellant gas.

13. The fire suppression system of claim 11, further comprising a user interface that is configured to (a) receive user input and (b) in response to receiving the user input, send a control input to the gas generator to cause the gas generator to generate the propellant gas.

14. The fire suppression system of claim 11, wherein the gas generator is configured to generate the propellant gas by initiating a chemical reaction of one or more precursors of the propellant gas.

15. The fire suppression system of claim 11,
wherein the container also includes a second propellant gas, the fire suppression system further comprising:
a pressure gauge configured to monitor the pressure within the container generated at least in part by the second propellant gas.

16. The fire suppression system of claim 11, wherein at least 60% and no more than 80% of a total volume of the container is filled with the fire suppressant.

17. The fire suppression system of claim 11, wherein the disc is configured to rupture in response to the pressure within the container exceeding a pressure within a range of 900 pounds per square inch gauge (psig) to 1100 psig.

18. A fire suppression system comprising:
a container including a fire suppressant, wherein the container comprises a first port and a second port;
a gas generator coupled to the first port, wherein the gas generator is configured to generate and flow a propellant gas into the container via the first port, thereby causing a pressure within the container to increase, the container including the fire suppressant prior to generation of the propellant gas;
a distribution manifold coupled to the second port;
a disc sealing the second port, wherein the disc is configured to (a) rupture in response to the pressure within the container exceeding a threshold pressure and (b) in response to the rupture, release the fire suppressant from the second port into the distribution manifold; and
a user interface that is configured to (a) receive user input and (b) in response to receiving the user input, send a control input to the gas generator to cause the gas generator to generate the propellant gas,
wherein at least 60% and no more than 80% of a total volume of the container is filled with the fire suppressant,
wherein the generated propellant gas is configured to flow into the container via the first port at least until substantially all of the fire suppressant included within the container prior to the generation of the propellant gas is expelled from the container via the second port, and
wherein the generated propellant gas is configured to cause the pressure within the container to remain greater than or equal to the threshold pressure at least until substantially all of the fire suppressant included within the container prior to the generation of the propellant gas is expelled from the container.

19. The fire suppression system of claim 18,
wherein the container also includes a second propellant gas, the fire suppression system further comprising:
a pressure gauge configured to monitor the pressure within the container generated at least in part by the second propellant gas.

* * * * *